United States Patent
Zhong et al.

(10) Patent No.: US 12,490,912 B2
(45) Date of Patent: Dec. 9, 2025

(54) HEART RATE DETECTION METHOD, HEART RATE DETECTION APPARATUS AND ELECTRONIC DEVICE

(71) Applicant: SHENZHEN GOODIX TECHNOLOGY CO., LTD., Shenzhen (CN)

(72) Inventors: Songjin Zhong, Shenzhen (CN); Fanglin Jiang, Shenzhen (CN); Hongjun Wen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 1029 days.

(21) Appl. No.: 17/130,654

(22) Filed: Dec. 22, 2020

(65) Prior Publication Data

US 2021/0106283 A1    Apr. 15, 2021

Related U.S. Application Data

(63) Continuation of application No. PCT/CN2019/073919, filed on Jan. 30, 2019.

(51) Int. Cl.
*A61B 5/024*    (2006.01)
*A61B 5/00*    (2006.01)
(Continued)

(52) U.S. Cl.
CPC ...... *A61B 5/02427* (2013.01); *A61B 5/02438* (2013.01); *A61B 5/6826* (2013.01);
(Continued)

(58) Field of Classification Search
CPC ............ A61B 5/02427; A61B 5/02438; A61B 5/6826; A61B 5/6898; A61B 5/725;
(Continued)

(56) References Cited

U.S. PATENT DOCUMENTS 5,795,300 A * 8/1998 Bryars ............... A61B 5/02438
600/503
2017/0020398 A1* 1/2017 Emadzadeh ....... A61B 5/02438
(Continued)

FOREIGN PATENT DOCUMENTS

CN     1392507 A    1/2003
CN     102467660 A    5/2012
(Continued)

*Primary Examiner* — Tse W Chen
*Assistant Examiner* — Joseph A Tombers (57) ABSTRACT

A heart rate detection method, a heart rate detection apparatus and an electronic device are provided. The heart rate detection method includes: acquiring a heart rate detection light signal, where the heart rate detection light signal is a light signal that is emitted upward from a ring light-emitting region of a display screen and enters a capturing region after being reflected by a finger of a user, and an intermediate region surrounded by the ring light-emitting region is a non-light-emitting region (601); and determining a heart rate of the user according to the heart rate detection light signal (602). According to the method, the accuracy of heart rate detection could be effectively improved.

13 Claims, 4 Drawing Sheets

(51) Int. Cl.
*A61B 5/1172* (2016.01)
*G06V 40/10* (2022.01)
*G06V 40/12* (2022.01)
*G06V 40/13* (2022.01)

(52) U.S. Cl.
CPC ............ *A61B 5/6898* (2013.01); *A61B 5/725* (2013.01); *A61B 5/7278* (2013.01); *A61B 5/7435* (2013.01); *A61B 5/7475* (2013.01); *G06V 40/10* (2022.01); *G06V 40/13* (2022.01); *G06V 40/1382* (2022.01); *A61B 5/02433* (2013.01); *A61B 5/1172* (2013.01); *A61B 2562/0233* (2013.01)

(58) Field of Classification Search
CPC ... A61B 5/7278; A61B 5/7435; A61B 5/7475; A61B 5/02433; A61B 5/1172; A61B 2562/0233; A61B 5/7235; A61B 2562/185; G06V 40/10; G06V 40/13; G06V 40/1382; G06F 18/00
See application file for complete search history.

(56) References Cited

U.S. PATENT DOCUMENTS

| | | | |
|---|---|---|---|
| 2017/0220838 A1 | 8/2017 | He et al. | |
| 2017/0270342 A1 | 9/2017 | He et al. | |
| 2017/0290520 A1* | 10/2017 | Mühlsteff | A61B 5/022 |
| 2017/0337413 A1 | 11/2017 | Bhat | |
| 2018/0046281 A1 | 2/2018 | Pi et al. | |
| 2018/0173343 A1 | 6/2018 | Pi et al. | |
| 2018/0260602 A1 | 9/2018 | He | |
| 2019/0099096 A1* | 4/2019 | Wang | H10K 39/34 |
| 2019/0102598 A1 | 4/2019 | Jiang | |
| 2019/0231277 A1* | 8/2019 | Fischer | A61B 5/725 |
| 2019/0310724 A1* | 10/2019 | Yeke Yazdandoost | G02F 1/13338 |
| 2020/0146569 A1* | 5/2020 | Lee | A61B 5/7221 |
| 2020/0342194 A1 | 10/2020 | Bhat | |

FOREIGN PATENT DOCUMENTS

| | | |
|---|---|---|
| CN | 104107038 A | 10/2014 |
| CN | 105877730 A | 8/2016 |
| CN | 106073744 A | 11/2016 |
| CN | 206039564 U | 3/2017 |
| CN | 107479631 A | 12/2017 |
| CN | 107526995 A | 12/2017 |
| CN | 107580709 A | 1/2018 |
| CN | 107820617 A | 3/2018 |
| CN | 108937957 A | 12/2018 |
| CN | 109196522 A | 1/2019 |
| CN | 109259750 A | 1/2019 |
| EP | 3278272 A1 | 2/2018 |
| EP | 3690701 A1 | 8/2020 |
| WO | 2016205832 A1 | 12/2016 |
| WO | 2017031665 A1 | 3/2017 |
| WO | 2018201350 A1 | 11/2018 |
| WO | 2019061535 A1 | 4/2019 |

* cited by examiner

Acquiring a heart rate detection light signal, where the heart rate detection light signal is a light signal that is emitted upward from a ring light-emitting region of a display screen and enters a capturing region after being reflected by a finger of a user, and an intermediate region surrounded by the ring light-emitting region is a non-light-emitting region ⸺ 601

Determining a heart rate of the user according to the heart rate detection light signal ⸺ 602

HEART RATE DETECTION METHOD, HEART RATE DETECTION APPARATUS AND ELECTRONIC DEVICE

CROSS-REFERENCE TO RELATED APPLICATIONS

This application is a continuation of International Application No. PCT/CN2019/073919, filed on Jan. 30, 2019, the disclosure of which is hereby incorporated by reference in its entirety.

TECHNICAL FIELD

Embodiments of the present application relate to the field of information technologies, and in particular, to a heart rate detection method, a heart rate detection apparatus and an electronic device.

BACKGROUND

With the rapid development of electronic device industry, a full screens have become a trend, and optical fingerprints have emerged. However, conventional optical fingerprints are only used for identifying texture information of a fingerprint and have a single function.

When light transmits through the skin tissue and is reflected back to a sensor, the light is attenuated to a certain extent. The absorption of light by muscles, bones, veins, or the like is substantially unchanged, but the absorption of light by blood is different, the absorption of light by blood changes due to the flow of blood in blood vessels, and a frequency of this change is related to a heart rate.

Therefore, heart rate detection may be performed by using an optical characteristic of an optical fingerprint. However, the existing technology that uses the optical characteristic of the optical fingerprint for heart rate detection has low accuracy.

SUMMARY

Embodiments of the present application provides a heart rate detection method, a heart rate detection apparatus and an electronic device, which could effectively improve accuracy of heart rate detection.

In a first aspect, a heart rate detection method is provided, including: acquiring a heart rate detection light signal, where the heart rate detection light signal is a light signal that is emitted upward from a ring light-emitting region of a display screen and enters a capturing region after being reflected by a finger of a user, and an intermediate region surrounded by the ring light-emitting region is a non-light-emitting region; and determining a heart rate of the user according to the heart rate detection light signal.

In some possible embodiments, the capturing region is a corresponding region obtained after the light signal is emitted upward from the ring light-emitting region and enters the non-light-emitting region after being reflected by the finger of the user.

In some possible embodiments, an outer diameter of the capturing region corresponds to an inner diameter of the ring light-emitting region.

In some possible embodiments, the heart rate detection light signal enters the capturing region through a lens unit.

In some possible embodiments, the acquiring the heart rate detection light signal includes: periodically acquiring the heart rate detection light signal.

In some possible embodiments, an acquisition period of the heart rate detection light signal is 5 ms.

The period of acquiring the heart rate detection light signal is 5 ms, which may be staggered with a light-emitting period of a display screen, thus avoiding interference of the display screen caused by the mutual influence of the acquisition period and the light-emitting period of the display screen, and further improving accuracy of determining the heart rate of the user.

In some possible embodiments, the determining the heart rate of the user according to the heart rate detection light signal includes: calculating an average value of the heart rate detection light signals acquired in each period; and determining the heart rate of the user according to the average value of the heart rate detection light signals in each period.

In some possible embodiments, the method further includes: filtering the average value of the heart rate detection light signals, to obtain the filtered average value of the heart rate detection light signals; and the determining the heart rate of the user according to the average value of the heart rate detection light signals in each period includes: determining the heart rate of the user according to the filtered average value of the heart rate detection light signals.

Since the average value of the heart rate detection light signals before filtering is performed is mingled with a lot of interference and noisy, filtering the heart rate detection light signal may remove the noise on data, so that the average value of the heart rate detection light signals is more accurate, and the calculated heart rate of the user may be close to an actual heart rate of the user.

In some possible embodiments, the filtering the average value of the heart rate detection light signals, to obtain the filtered average value of the heart rate detection light signals includes: performing sliding filtering on the average value of the heart rate detection light signals, to obtain the filtered average value of the heart rate detection light signals.

Using sliding filter, dynamic detection may be always performed, which makes the filtering effect better.

In some possible embodiments, the performing sliding filtering on the average value of the heart rate detection light signals includes:
  performing low-pass filtering on the average value of the heart rate detection light signals with a window length being a first numerical value after a number of periods of acquiring the heart rate detection light signals is greater than the first numerical value, to obtain a first heart rate detection light signal;
  performing low-pass filtering on the average value of the heart rate detection light signals with a window length being a second numerical value after a number of periods of acquiring the heart rate detection light signals is greater than the second numerical value, to obtain a second heart rate detection light signal, where the second numerical value is greater than the first numerical value; and
  subtracting the first heart rate detection light signal and the second heart rate detection light signal from each other, to obtain the filtered average value of the heart rate detection light signals.

In some possible embodiments, the heart rate of the user satisfies an equation:

$$H = \frac{K * 60000}{D * M},$$

where H is the heart rate of the user, K is a number of peaks of the average value of the heart rate detection light signals in a plurality of acquisition periods, D is a number of acquisition periods, M is the acquisition period, and the acquisition period is a period for acquiring the heart rate detection light signal.

In a second aspect, a heart rate detection apparatus is provided, including:

a sensing unit configured to acquire a heart rate detection light signal, where the heart rate detection light signal is a light signal that is emitted upward from a ring light-emitting region of a display screen and enters a capturing region after being reflected by a finger of a user, and an intermediate region surrounded by the ring light-emitting region is a non-light-emitting region; and a processing unit configured to determine a heart rate of the user according to the heart rate detection light signal.

In some possible embodiments, the capturing region is a corresponding region obtained after the light signal is emitted upward from the ring light-emitting region and enters the non-light-emitting region after being reflected by the finger of the user.

In some possible embodiments, an outer diameter of the capturing region corresponds to an inner diameter of the ring light-emitting region.

In some possible embodiments, the apparatus further includes: a lens unit configured to converge the heart rate detection light signal to the capturing region.

In some possible embodiments, the sensing unit is configured to: periodically acquire the heart rate detection light signal.

In some possible embodiments, an acquisition period of the heart rate detection light signal is 5 ms.

In some possible embodiments, the processing unit is configured to: calculate an average value of the heart rate detection light signals acquired in each period; and determine the heart rate of the user according to the average value of the heart rate detection light signals in each period.

In some possible embodiments, the processing unit is further configured to: filter the average value of the heart rate detection light signals, to obtain the filtered average value of the heart rate detection light signals; and determine the heart rate of the user according to the filtered average value of the heart rate detection light signals.

In some possible embodiments, the processing unit is configured to: perform sliding filtering on the average value of the heart rate detection light signals, to obtain the filtered average value of the heart rate detection light signals.

In some possible embodiments, the processing unit is configured to: perform low-pass filtering on the average value of the heart rate detection light signals with a window length being a first numerical value after a number of periods of acquiring the heart rate detection light signals is greater than the first numerical value, to obtain a first heart rate detection light signal; perform low-pass filtering on the average value of the heart rate detection light signals with a window length being a second numerical value after a number of periods of acquiring the heart rate detection light signals is greater than the second numerical value, to obtain a second heart rate detection light signal, where the second numerical value is greater than the first numerical value; and subtract the first heart rate detection light signal and the second heart rate detection light signal from each other, to obtain the filtered average value of the heart rate detection light signals.

In some possible embodiments, the heart rate of the user satisfies an equation:

$$H = \frac{K*60000}{D*M},$$

where H is the heart rate of the user, K is a number of peaks of the average value of the heart rate detection light signals in a plurality of acquisition periods, D is a number of acquisition periods, M is the acquisition period, and the acquisition period is a period for acquiring the heart rate detection light signal.

In some possible embodiments, the apparatus is a fingerprint module.

In a third aspect, an electronic device is provided, including the heart rate detection apparatus in the second aspect or any possible implementation manner of the second aspect.

Therefore, in an embodiment of the present application, a heart rate of a user is determined by using a light signal that is emitted upward from a ring light-emitting region of a display screen and enters a capturing region after being reflected by a finger of the user. Since all the light signals in the capturing region are reflected by the finger, they all carry the heart rate signal of the user, which avoids the interference of light signals that do not carry the heart rate signal of the user, thus improving the accuracy of determining the heart rate of the user. In addition, the light signal for determining the heart rate of the user in an embodiment of the present application is some light signals emitted from the ring light-emitting region, which could reduce an amount of calculation, thereby increasing a rate of determining the heart rate of the user.

DESCRIPTION OF EMBODIMENTS

Technical solutions in embodiments of the present application will be described hereinafter with reference to the accompanying drawings.

It should be understood that embodiments of the present application may be applied to an optical fingerprint system, including but not limited to an optical fingerprint identification system and a medical diagnostic product based on optical fingerprint imaging. The embodiments of the present application are only described by taking an optical fingerprint system as an example, which should not constitute any limitation to the embodiments of the present application, and the embodiments of the present application are also applicable to other systems using an optical imaging technology or the like.

As a common application scenario, the optical fingerprint system provided in an embodiment of the present application may be applied to a smart phone, a tablet computer, and other mobile terminals having a display screen or other terminal devices. More specifically, in the foregoing terminal device, a fingerprint identification apparatus may be specifically an optical fingerprint apparatus, which may be disposed in a partial region or an entire region under a display screen, thereby forming an under-display optical fingerprint system. Alternatively, the fingerprint identification apparatus may be partially or entirely integrated into the interior of the display screen of the terminal device to form an in-display optical fingerprint system.

Figure 1:
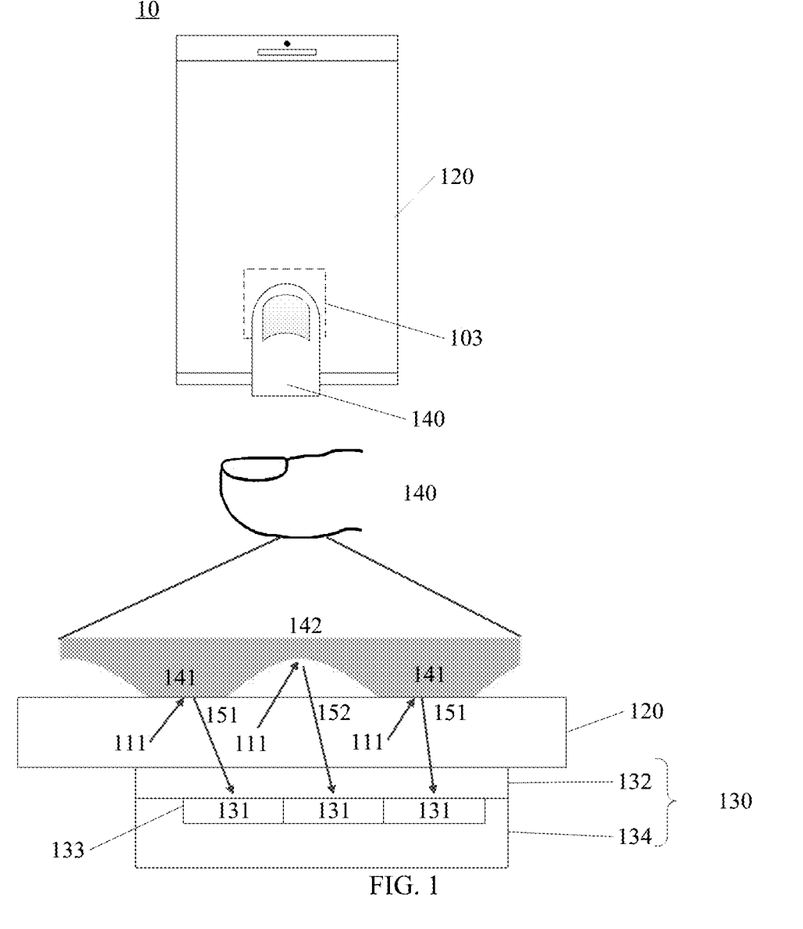
FIG. 1 is a schematic structural diagram of an electronic device applicable to an embodiment of the present application.

FIG. 1 is a schematic structural diagram of a terminal device applicable to an embodiment of the present application. A terminal device 10 includes a display screen 120 and an optical fingerprint apparatus 130, where the optical fingerprint apparatus 130 is disposed in a partial region under the display screen 120. The optical fingerprint apparatus 130 includes an optical fingerprint sensor including a sensing array 133 having a plurality of optical sensing units 131, and a region where the sensing array is located or its sensing region is a fingerprint detection region 103 of the optical fingerprint apparatus 130. As shown in FIG. 1, the fingerprint detection region 103 is located in a display region of the display screen 120. In an alternative embodiment, the optical fingerprint apparatus 130 may also be disposed at other positions, such as a side of the display screen 120 or an edge non-light transmitting region of the terminal device 10, and a light signal of at least part of the display region of the display screen 120 is directed to the optical fingerprint apparatus 130 through light path design, such that the fingerprint detection region 103 is actually located in the display region of the display screen 120.

It should be understood that an area of the fingerprint detection region 103 may be different from an area of the sensing array of the optical fingerprint apparatus 130. For example, the area of the fingerprint detection region 103 of the optical fingerprint apparatus 130 may be larger than the area of the sensing array of the optical fingerprint apparatus 130 through light path design such as lens imaging, reflective folding light path design or other light path design such as light convergence or reflection. In other alternative implementation manners, if the light path is directed in a manner of, for example, light collimation, the area of the fingerprint detection region 103 of the optical fingerprint apparatus 130 may also be designed to be substantially identical with the area of the sensing array of the optical fingerprint apparatus 130.

Therefore, when a user needs to unlock the terminal device or perform other fingerprint verification, a fingerprint input may be implemented merely by pressing a finger against the fingerprint detection region 103 located on the display screen 120. Since fingerprint detection may be implemented in the display, there is no need to exclusively reserve space for a front surface of the terminal device 10 adopting the foregoing structure to set a fingerprint button (such as a Home button), so that a full screen solution may be adopted; that is, the display region of the display screen 120 may be substantially extended to an entire front surface of the terminal device 10.

As an alternative implementation manner, as shown in FIG. 1, the optical fingerprint apparatus 130 includes a light detection portion 134 and an optical component 132. The light detection portion 134 includes the sensing array, a readout circuit and other auxiliary circuits electrically connected to the sensing array, which is fabricated in a die by a semiconductor process such as an optical imaging chip or an optical fingerprint sensor; the sensing array is specifically a photo detector array including a plurality of photo detectors distributed in an array, and the photo detectors may be used as the optical sensing unit as described above.

The optical component 132 may be disposed above the sensing array of the light detection portion 134, and may specifically include a filter layer, a light directing layer or a light path directing structure, and other optical elements, the filter layer may be used to filter out ambient light passing through a finger, and the light directing layer or light path directing structure is mainly used to direct reflected light reflected from a finger surface to the sensing array for optical detection.

In a specific implementation, the optical component 132 and the light detection portion 134 may be encapsulated in the same optical fingerprint component. For example, the optical component 132 and the light detection portion 134 may be encapsulated in the same optical fingerprint chip, or the optical component 132 may be disposed outside a chip where the light detection portion 134 is located, for example, the optical component 132 is attached above the chip, or a part of elements of the optical component 132 are integrated into the chip.

The light directing layer or light path directing structure of the optical component 132 has various implementations, for example, the light directing layer may be specifically a collimator layer made of a semiconductor silicon wafer, which has a plurality of collimating units or micro-pore arrays, and the collimating units may be a small hole. Light beam that is in the reflected light reflected from the finger and is vertically incident to the collimating unit may pass through the hole and be received by the optical sensing unit below it. However, light beam with an excessive incident angle is attenuated through multiple reflections inside the collimating unit, therefore, each optical sensing unit may substantively only receive the reflected light reflected from the fingerprint directly above the optical sensing unit, and thus the sensing array may detect a fingerprint image of the finger.

In another embodiment, the light directing layer or the light path directing structure may also be an optical lens layer having one or more lens units, such as a lens group composed of one or more aspheric lenses, for converging reflected light reflected from a finger to the sensing array of the light detection portion 134 below it, so that the sensing array may perform imaging based on the reflected light to obtain the fingerprint image of the finger. Optionally, an optical lens layer may be provided with a pinhole in the light path of the lens unit, and the pinhole may cooperate with the optical lens layer to expand the field of view of the optical fingerprint apparatus, to improve a fingerprint imaging effect of the optical fingerprint apparatus 130.

In other embodiments, the light directing layer or the light path directing structure may also specifically adopt a micro-lens layer having a micro-lens array formed by a plurality of micro-lenses, which may be formed above the sensing array of the light detection portion 134 by a semiconductor growth process or other processes, and each micro-lens may correspond to one of the sensing units of the sensing array respectively. Furthermore, other optical film layers such as a dielectric layer or a passivation layer, may be formed between the micro-lens layer and the sensing unit, and more specifically, a light shielding layer having a micro-pore may also be formed between the micro-lens layer and the sensing unit, where the micro-pore is formed between the corresponding micro-lens and the sensing unit, and the light shielding layer may block optical interference between adjacent micro-lenses and the sensing units, such that light corresponding to the sensing unit is converged to the interior of the micro-pore through the micro-lens and is transmitted to the sensing unit via the micro-pore to perform optical fingerprint imaging.

It should be understood that several implementations of the forgoing light path directing structure may be used alone or in combination, for example, a micro-lens layer may be further disposed under the collimator layer or the optical lens layer. Certainly, when the collimator layer or the optical lens layer is used in combination with the micro-lens layer, the specific laminated structure or light path may need to be adjusted according to actual needs.

As an optional embodiment, the display screen 120 may adopt a display screen with a self-emitting display unit, such as an organic light-emitting diode (OLED) display screen or a micro-LED display screen. Taking an OLED display screen as an example, the optical fingerprint apparatus 130 may use a display unit (that is, an OLED light source) located at the fingerprint detection region 103 of the OLED display screen 120 as an excitation light source for optical fingerprint detection. When a finger 140 is pressed against the fingerprint detection region 103, the display screen 120 emits a beam of light 111 to a target finger 140 above the fingerprint detection region 103, and the light 111 is reflected by a surface of the finger 140 to form reflected light or form scattered light after scattering inside the finger 140. In related patent applications, the reflected light and the scattered light are referred to as reflected light for convenience of description. Since a ridge and a valley of a fingerprint have different light reflecting abilities, reflected light 151 from the ridge of the fingerprint and reflected light 152 from the valley of the fingerprint have different light intensities; after passing through the optical component 132, the reflected light is received by the sensing array in the optical fingerprint apparatus 130 and converted into a corresponding electrical signal, that is, a fingerprint detection signal; and fingerprint image data may be obtained based on the fingerprint detection signal, and fingerprint matching verification may be further performed, thereby implementing an optical fingerprint identification function at the terminal device 10.

In other embodiments, the optical fingerprint apparatus 130 may also use a built-in light source or an external light source to provide a light signal for fingerprint detection. In this case, the optical fingerprint apparatus 130 may be applied to a non-self-light-emitting display screen, such as a liquid crystal display screen or other passive light-emitting display screens. Taking a liquid crystal display screen having a backlight module and a liquid crystal panel as an example, in order to support under-display fingerprint detection of the liquid crystal display screen, the optical fingerprint system of the terminal device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the terminal portion 10. The optical fingerprint apparatus 130 may be disposed under the liquid crystal panel or the edge region of the protective cover, and light for fingerprint detection may reach the optical fingerprint apparatus 130 by being directed by a light path. Alternatively, the optical fingerprint apparatus 130 may also be disposed under the backlight module, and the backlight module allows the light for fingerprint detection to pass through the liquid crystal panel and the backlight module and reach the optical fingerprint apparatus 130 by providing a hole on film layers such as a diffusion sheet, a brightening sheet, a reflection sheet or the like, or by performing other optical designs. When the optical fingerprint apparatus 130 uses a built-in light source or an external light source to provide a light signal for fingerprint detection, a detection principle is consistent with the foregoing description.

It should be understood that, in a specific implementation, the terminal device 10 further includes a transparent protective cover; the cover may be a glass cover or a sapphire cover, which is located above the display screen 120 and covers a front surface of the terminal portion 10. Therefore, in an embodiment of the present application, the so-called the finger being pressed against the display screen 120 actually refers to the finger being pressed against the cover above the display screen 120 or a surface of the protective layer covering the cover.

On the other hand, in some embodiments, the optical fingerprint apparatus 130 may only include one optical fingerprint sensor, and in this case, the fingerprint detection region 103 of the optical fingerprint apparatus 130 has a smaller area and a fixed position, and therefore, the user needs to press the finger at a specific position of the fingerprint detection region 103 when a fingerprint input is performed, otherwise the optical fingerprint apparatus 130 may not be able to capture the fingerprint image, thereby resulting in poor user experience.

In other alternative embodiments, the optical fingerprint apparatus 130 may specifically include a plurality of optical fingerprint sensors which may be disposed under the display screen 120 side by side in a splicing manner, and sensing regions of the plurality of optical fingerprint sensors collectively constitute the fingerprint detection region 103 of the optical fingerprint apparatus 130. In other words, the fingerprint detection region 103 of the optical fingerprint apparatus 130 may include a plurality of sub-regions, each sub-region corresponding to a sensing region of one of the optical fingerprint sensors, so that a fingerprint capturing region 103 of the optical fingerprint apparatus 130 may be extended to a main region of a lower portion of the display screen, that is, it is extended to a generally pressed region by the finger, thereby achieving a blind pressing type of a fingerprint input operation. Alternatively, when the number of the optical fingerprint sensors is sufficient, the fingerprint detection region 103 may also be extended to half of the display region or even the entire display region, thereby achieving half-screen or full-screen fingerprint detection.

Generally, when the light 111 illuminates the ridge of the finger, since the ridge is closely attached to the display screen 120 and has a refractive index similar to that of the display screen 120, most of the light 111 is absorbed and a dark spot may be formed on a sensor. When the light 111 illuminates the valley of the finger, since there is air between the valley and the display screen 120, the refractive index of the display screen 120 is greater than that of the air, at this time, most of the light 111 may be reflected, thus forming a bright spot on the sensor.

In fact, the light signal is not only absorbed on the ridge, but also reflected on valley, most of the light signals may enter the human skin for multiple reflections and absorption, and the heart rate information of the user may be carried on the light signals and sensed by the sensor. As shown by the light 111 in FIG. 1, the light signal enters the interior of the target finger, and the flowing blood may dynamically absorb light energy with different energy. After light with same light energy passes through the finger, the light signal with a heart rate signal may be generated.

At present, most of the optical fingerprints use a complete light spot in application, and the light spot may emit a light signal upward or downward, where the light signal emitted downward by the light spot is called leaked light. Since the leaked light is a light signal emitted downward by the display screen without passing through the finger, a leaked light portion does not carry any heart rate information of the user. In addition, the leaked light portion has a strong signal offset, which may cause the sensor to enter a saturation state in advance and distort the heart rate signal.

Therefore, in order to improve a signal-to-noise ratio of the heart rate signal and the accuracy of heart rate detection, leaked light may be removed from the light path. In view of this, an embodiment of the present application proposes a light spot, an intermediate region of the light spot does not emit light, that is, the light spot is a ring light-emitting region, as shown in FIGS. 2 and 4.

Figure 2:
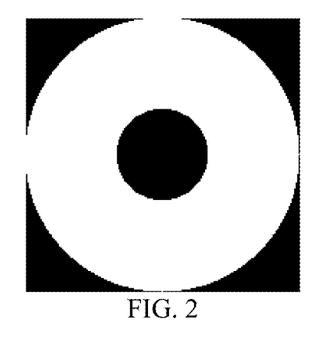
FIG. 2 is a schematic diagram of a light spot provided by an embodiment of the present application.
Figure 3:
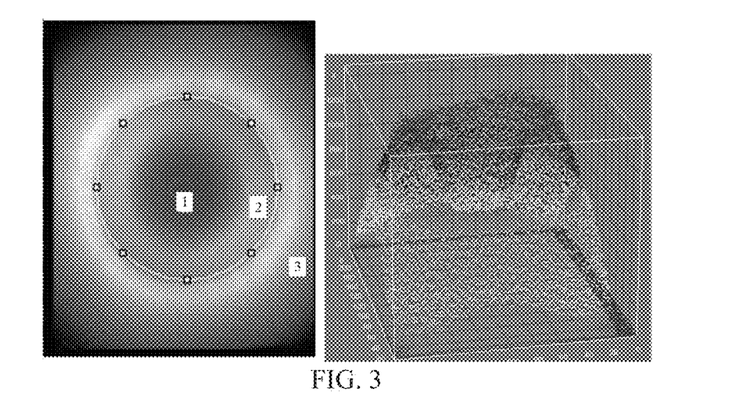
FIG. 3 is a schematic diagram of an image on a sensor corresponding to a light spot provided by an embodiment of the present application.

An image on the sensor corresponding to a light spot shown in FIG. 2 is shown in FIG. 3, and the image on the sensor corresponding to the light spot may be understood as an image obtained on the sensor after a light signal emitted by the light spot is reflected by a finger of a user. The left picture of FIG. 3 is a 2D image, and the right picture thereof is a 3D image. It can be seen from FIG. 3 that there is substantively no light in a first region, and therefore the first region is not used to detect a heart rate; a third region includes two-layer imaging which is actually two-layer leaked light imaging. On the one hand, the two-layer leaked light is useless light without the heart rate signal, and on the other hand, it may affect the dynamic response range of the sensor, and thus, in the embodiment of the present application, the third region is not used to detect a heart rate. Therefore, only a second region is the most ideal identification region. On the one hand, this region is all composed of reflected signals, and a heart rate signal with greater energy exists in this region, which is beneficial to improve the accuracy of extracting the heart rate signal. On the other hand, it can be seen from the 3D image that since there is no a convex peak in the intermediate region, the dynamic range will not enter the saturation state too early, which is beneficial to improve the accuracy of detecting the heart rate signal.

Figure 4:
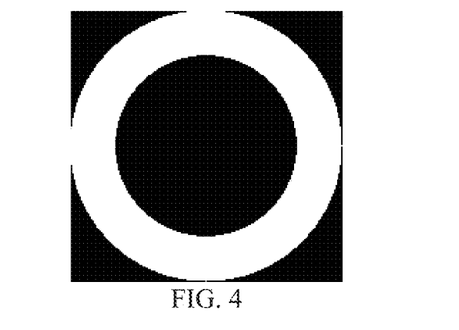
FIG. 4 is a schematic diagram of another light spot provided by an embodiment of the present application.
Figure 5:
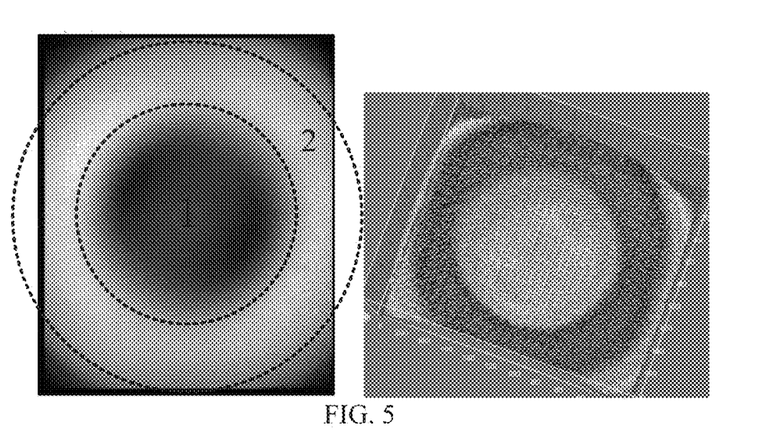
FIG. 5 is a schematic diagram of an image on a sensor corresponding to another light spot provided by an embodiment of the present application.

FIG. 4 is a schematic diagram of another light spot proposed by an embodiment of the present application. An image on the sensor corresponding to the light spot is shown in FIG. 5, where the left picture of FIG. 5 is a 2D image and the right picture thereof is a 3D image. It can be seen that, since the third region has exceeded a range that may be sensed by the sensor, the image on the sensor corresponding to the light spot shown in FIG. 5 on the sensor only includes the first and second regions in FIG. 3, and does not include the third region.

The intermediate region of the light spot does not emit light, and a region except the intermediate region emit light, so that the light signals from the region except the intermediate region may be incident on the finger of the user at a certain angle, and then may be reflected back to a region corresponding to the intermediate non-light-emitting region. In this way, the light signals in a region corresponding to the non-light-emitting region of the light spot on the sensor (for example, the second region in FIGS. 3 and 5) are all reflected by the finger, and there is no leaked light, so they all carry heart rate information. Therefore, heart rate detection is performed by using the light signals in the second region of FIG. 3 and FIG. 5, which may effectively improve the accuracy of heart rate detection.

Figure 6:
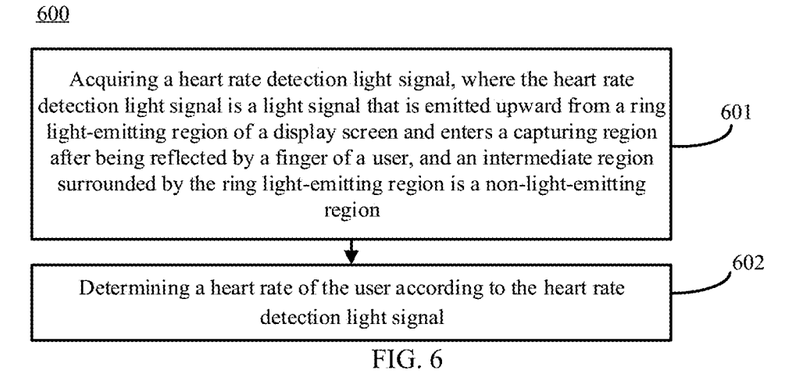
FIG. 6 is a schematic flowchart of a heart rate detection method according to an embodiment of the present application.

FIG. 6 shows a schematic flowchart of a heart rate detection method according to an embodiment of the present application. It should be noted that the heart rate detection method in FIG. 6 is based on the light spots shown in FIGS. 2 and 4.

It should be understood that steps or operations in FIG. 6 are merely examples, and other operations or variants of various operations in FIG. 6 may alternatively be performed in the embodiment of the present application. In addition, the steps in FIG. 6 may be performed in an order different from that presented in FIG. 6, and the operations in FIG. 6 may not necessarily be all performed.

The method shown in FIG. 6 may be performed by a heart rate detection apparatus. Optionally, the heart rate detection apparatus may be a fingerprint module, which corresponds to the optical fingerprint apparatus 130 in FIG. 1; or the heart rate detection apparatus may be an electronic device including a fingerprint module, which is not specifically limited in the embodiment of the present application.

The method of the embodiment of the present application is executed in the fingerprint module, and the terminal device only receives final heart rate data, which could avoid long transmission delay generated when a large amount of data related to heart rate calculation is uploaded to the terminal device.

Optionally, the method of the embodiment of the present application may be executed in a processor of the terminal device.

As shown in FIG. 6, a heart rate detection method 600 may include the following steps.

601, a heart rate detection light signal is acquired. The heart rate detection light signal is a light signal that is emitted upward from a ring light-emitting region of a display screen and enters a capturing region after being reflected by a finger of a user, and an intermediate region surrounded by the ring light-emitting region is a non-light-emitting region.

602, a heart rate of the user is determined according to the heart rate detection light signal.

The ring light-emitting region mentioned above may be the light spot shown in FIG. 2 or FIG. 4, and the capturing region mentioned above may be the second region in FIG. 3 or FIG. 5.

Optionally, an embodiment of the present application does not specifically limit the sizes of the inner diameter and outer diameter of the ring light-emitting region, the shape of the ring light-emitting region and the color of the ring light-emitting region.

For example, the sizes of the inner diameter and outer diameter of the ring light-emitting region may be arbitrarily modified within the fingerprint detection range. Referring to FIGS. 2 and 4, it can be seen that the inner diameter of the ring light-emitting region of FIG. 2 is smaller than that of the ring light-emitting region of FIG. 4.

For another example, with reference to FIGS. 2 and 4, the shape of the ring light-emitting region may be a circular ring. Of course, the shape of the ring light-emitting region may also be other shapes, such as a square ring, an elliptical ring, or the like.

For another example, the color of the ring light-emitting region may be a pure color, for example, white or yellow; or the color of the ring light-emitting region may be any mixed color, such as a mixed color of red, green and yellow.

Optionally, the sizes of the inner diameter and outer diameter of the ring light-emitting region, and the shape and color of the ring light-emitting region may be set or changed at any time according to requirements.

For example, the color and/or shape of the ring light-emitting region may be changed at will.

For another example, the color and/or shape of the ring light-emitting region may be periodically changed. For example, a period of a ring light-emitting region may be 10 ms, and a color of the ring light-emitting region during the first 10 ms is white and a shape thereof is a circular ring; a color of the ring light-emitting region during the 10 ms-20 ms is mixed color and a shape thereof is an elliptical ring; and a color of the ring light-emitting region during the 20 ms-30 ms is a mixed color, and a shape thereof is a square ring.

For another example, the color and/or shape of the ring light-emitting region may be changed based on an event trigger. For example, at least one of the sizes of the inner diameter and outer diameter of the ring light-emitting region, and the shape and color of the ring light-emitting region changes when the user performs the fingerprint unlocking every 5 times.

It should be understood that the term "and/or" herein merely describes association relations between associated objects, and denotes three relations, for example, A and/or B may denote three situations, namely A exists separately, A and B exist simultaneously and B exists separately.

Optionally, the ring light-emitting region may also be used to indicate a position of a fingerprint detection region in a display screen, so that the user may determine the fingerprint detection region according to the region.

For example, when the ring light-emitting region lights up, the user may know a position of the lighted ring light-emitting region, that is, the fingerprint detection region, so that the finger may be placed on the fingerprint detection region for fingerprint identification.

Optionally, in one embodiment of the present application, the capturing region may be a corresponding region obtained after the light signal is emitted upward from the ring light-emitting region and enters the non-light-emitting region after being reflected by the finger of the user. Therefore, there is no leaked light in the capturing region, which is all composed of reflected light signals.

Optionally, the outer diameter of the capturing region may correspond to the inner diameter of the ring light-emitting region.

The capturing region being a corresponding region obtained after the light signal is emitted upward from the ring light-emitting region and enters the non-light-emitting region after being reflected by the finger of the user may be understood as: if a ratio of an image obtained by the ring light-emitting region on the sensor to the ring light-emitting region is 1:1, the capturing region may be part or all of the region obtained after the light signal is emitted from the ring light-emitting region and enters the non-light-emitting region after being reflected by the finger of the user.

If all the light signals emitted upward from the ring light-emitting region may be reflected by the finger of the user and then enters the non-light-emitting region, a size of the capturing region may be the same as that of the non-light-emitting region, that is, the capturing region may be the entire region of the non-light-emitting region; and if some light signals emitted upward from the ring light-emitting region may be reflected by the finger of the user and then enters the non-light-emitting region, the capturing region is a partial region of the non-light-emitting region.

At this time, the outer diameter of the capturing region corresponding to the inner diameter of the ring light-emitting region may be understood as: the outer diameter of the capturing region is equal to the inner diameter of the ring light-emitting region. Referring to FIGS. 2 and 3 again, the inner diameter of the ring light-emitting region in FIG. 2 (i.e., a diameter of the non-light-emitting region) is equal to the outer diameter of the second region (i.e., the capturing region) in FIG. 3.

The heart rate detection signal may enter the capturing region through a lens unit.

It can be understood that since the heart rate detection light signal may enter the capturing region through the lens unit, the image obtained by the ring light-emitting region on the sensor is generally smaller than the ring light-emitting region. Generally, a ratio of the ring light-emitting region to the image obtained by the ring light-emitting region on the sensor is generally 6:1, and at this time, the inner diameter of the ring light-emitting region may be 6 times the size of the outer diameter of the capturing region. In addition, if all the light signals emitted upward from the ring light-emitting region may be reflected by the finger of the user and enter the non-light-emitting region, the non-light-emitting region may be 6 times the size of the capturing region.

After the capturing region is determined based on the designed light spot, the embodiment of the present application may perform the heart rate detection based on the heart rate detection light signal in the capturing region.

Optionally, in one embodiment of the present application, the heart rate detection light signal may be periodically acquired. Preferably, an acquisition period of the heart rate detection light signal may be 5 ms. In other words, an exposure time of acquiring the heart rate detection light signal is 5 ms/frame.

Make the exposure time is a fixed 5 ms, which may be staggered with a light-emitting period of a display screen, the screen interference caused by the mutual influence of the exposure time and the light-emitting period of the display screen may be avoided, thus further improving the accuracy of determining the heart rate of the user.

After acquiring the heart rate detection light signal, optionally, in one embodiment of the present application, an average value of the heart rate detection light signals acquired in each period may be calculated, and then the heart rate of the user may be determined according to the average value of the heart rate detection light signals in each period.

As an example, the heart rate of the user may be calculated according to equation (1):

$$H = \frac{K * 60000}{D * M} \quad (1)$$

where H is the heart rate of the user, K is a number of peaks of the average value of the heart rate detection light signals in a plurality of acquisition periods, D is a number of acquisition periods, M is the acquisition period. In other words, in a statistical period, the average value of the heart rate detection light signals has K peaks, and there are D frames between the first peak and the last peak.

As another example, Fourier transform may be performed on the average value of the heart rate detection light signals, and then a frequency with the largest amplitude around 1 Hz is obtained, and this frequency is the heart rate of the user.

Since there is a lot of interference mingled in the average value of the heart rate detection light signals, the accuracy of the heart rate of the user obtained according to the average value of the heart rate detection light signals is low. Therefore, the average value of the heart rate detection light signals may be filtered to obtain the filtered average value of the heart rate detection light signals, and then the heart rate of the user may be determined according to the filtered average value of the heart rate detection light signals.

Since the noise on the data may be removed by filtering the heart rate detection light signal, the heart rate of the user is calculated based on the average value of the filtered heart rate detection light signals, so that the accuracy of determining the heart rate of the user is high, which is close to an actual heart rate of the user.

In the process of filtering the average value of the heart rate detection light signals, as an example, the average value of the heart rate detection light signals may be filtered by means of average filtering, Gaussian filtering, or the like.

It should be understood that the implementation process of average filtering, Gaussian filtering, or the like in the embodiment of the present application may refer to the implementation process of average filtering, Gaussian filtering, or the like in related technologies, which will not be described here for brevity.

As another example, the average value of the heart rate detection light signals may be filtered by sliding filtering.

Specifically, after an acquired period number of the heart rate detection light signal is greater than a first numerical value, low-pass filtering may be performed on the average value of the heart rate detection light signals with a window length being the first numerical value, to obtain a first heart rate detection light signal; and after a period number of the heart rate detection light signal is greater than a second numerical value, low-pass filtering may be performed on the average value of the heart rate detection light signals with a window length being the second numerical value, to obtain a second heart rate detection light signal, where the second numerical value is greater than the first numerical value; and then the first heart rate detection light signal and the second heart rate detection light signal may be subtracted from each other, to obtain the filtered average value of the heart rate detection light signals.

Hereinafter, a heart rate detection method of an embodiment of the present application will be explained with a specific example.

Figure 7:
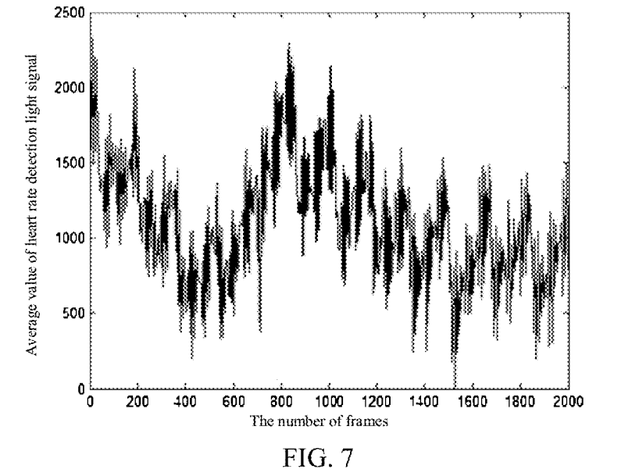
FIG. 7 is a schematic diagram of an average value of heart rate detection light signals without filtering according to an embodiment of the present application.

First, a heart rate detection light signal is acquired frame by frame, and an average value of heart rate detection light signals in a capturing region is calculated in firmware to obtain the average value of the heart rate detection light signals in each frame, as shown in FIG. 7. A fixed exposure time is 5 ms/frame, and data sensed by a sensor may reach a certain unsaturated maximum value by modifying the analog magnification of a chip.

Then, after the number of captured frames is more than 10 frames, low-pass filtering is performed on the average value of the heart rate detection light signals with a window length being 10, to obtain a set of data A1; and after the number of captured data is more than 20 frames, low-pass filtering is performed on the average value of the heart rate detection light signals with a window length being 20, to obtain a set of data A2. After that, A1 is subtracted from A2 to obtain the average value of the heart rate detection light signals after band-pass filtering, as shown in FIG. 8.

Figure 8:
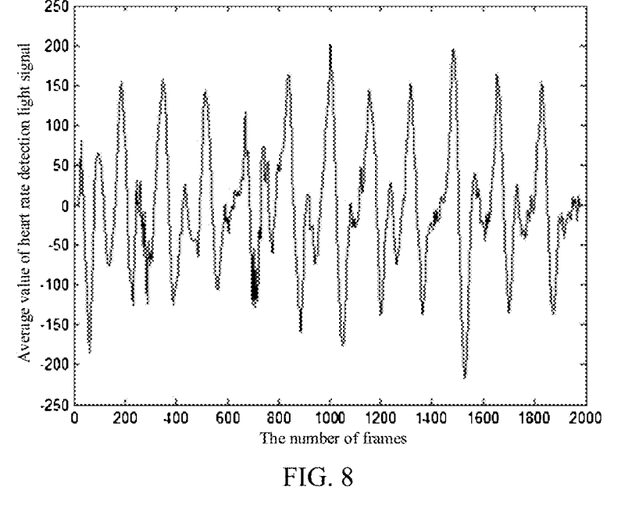
FIG. 8 is a schematic diagram of a filtered average value of heart rate detection light signals according to an embodiment of the present application.

It can be seen from FIG. 8 that there are 11 peaks in an average value of heart rate detection light signals in an entire statistical period, and there are 1950 frames between the first peak and the last peak, an equation (1) may be used to obtain:

$$H = \frac{11 * 60000 \text{ ms}}{1950 * 5 \text{ ms}} \approx 67.$$

Therefore, a heart rate of the user is 67 beats/min. Finally, the calculated heart rate of 67 beats/min is sent to a terminal device, and the calculated heart rate data is displayed on the terminal device.

The embodiment of the present application does not limit the manner in which the terminal device displays the heart rate data. For example, the terminal device may display the heart rate data on the display screen by numbers; or the terminal device may broadcast the heart rate data by voice; or the terminal device may display the heart rate data on the display screen as well as broadcast the heart rate data by voice.

Optionally, the method of the embodiment of the present application may further include: before determining the heart rate of the user, fingerprint authentication may be performed on the user to determine whether the user is the owner of the terminal device. If the fingerprint authentication fails, it may be determined that the identity authentication fails, and the heart rate of the user will no longer be determined; and if the fingerprint authentication is passed, the heart rate of the user may be further determined.

It should be understood that the implementation manner of fingerprint authentication is not specifically limited in the embodiment of the present application, and any manner that may implement fingerprint authentication may be included in the scope of the embodiment of the present application. For example, the acquired fingerprint image may be matched with a preset fingerprint template, and if the matching succeeds, the fingerprint authentication succeeds; and if the matching is not successful, the fingerprint authentication fails.

For the conventional optical fingerprint sensor, the identity authentication is performed through texture information of the fingerprint, and in this case, the authentication may be passed as long as the fake finger or fake fingerprint film is made of rubber, plasticine and other materials.

Therefore, the method of the embodiment of the present application may also include: after determining the heart rate of the user, determining whether the heart rate is within a heart rate range of a person, where if it is within the heart rate range of a person, the identity authentication is passed; and if it is not within the heart rate range of a person, the finger may be considered as a fake finger, and the identity authentication fails.

For example, whether a fingerprint is a living fingerprint may be determined by a signal value of a reflected light signal. Specifically, it may be determined whether the signal value of the reflected light signal is within a preset numerical range, and if the size of the reflected light signal is within the preset numerical range, it may be determined that it is a living fingerprint and the identity authentication is passed.

In an embodiment of the present application, a heart rate of a user is determined by using a light signal that is emitted upward from a ring light-emitting region of a display screen and enters a capturing region after being reflected by a finger of the user. Since all the light signals in the capturing region are reflected by the finger, they all carry the heart rate signal of the user, which avoids the interference of light signals that do not carry the heart rate signal of the user, thus improving the accuracy of determining the heart rate of the user. In addition, the light signal for determining the heart rate of the user in an embodiment of the present application is some light signals emitted from the ring light-emitting region, which could reduce an amount of calculation, thereby increasing a rate of determining the heart rate of the user.

It should be understood that sequence numbers of the foregoing processes do not mean execution sequences in the embodiments of the present application. The execution sequences of the processes should be determined according to functions and internal logic of the processes, and should not be construed as any limitation on the implementation processes of the embodiments of the present application.

The heart rate detection method of the embodiment of the present application is described in detail above, and a heart rate detection apparatus of an embodiment of the present application will be described below.

It should be understood that the heart rate detection apparatus in the embodiment of the present application may execute the heart rate detection method in the embodiment of the present application, and has a function of executing the corresponding method.

Figure 9:
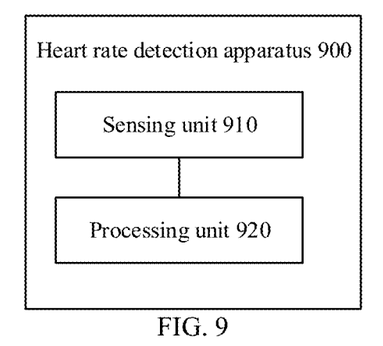
FIG. 9 is a schematic block diagram of a heart rate detection apparatus according to an embodiment of the present application.

FIG. 9 shows a schematic block diagram of a heart rate detection apparatus 900 according to an embodiment of the present application. As shown in FIG. 9, the heart rate detection apparatus 900 includes a sensing unit 910 and a processing unit 920.

Optionally, the heart rate detection apparatus 900 may be a fingerprint module, and when the heart rate detection apparatus 900 is a fingerprint module, the processing unit 920 may be a processing unit in the fingerprint module. The heart rate detection apparatus is a fingerprint module, which can avoid long transmission delay when data is uploaded to the terminal device.

Optionally, the heart rate detection apparatus 900 may be a terminal device, and when the heart rate detection apparatus 900 is a terminal device, the processing unit 920 may be a processor in the terminal device.

The processor may be a central processing unit (CPU), and the processor may also be another general-purpose processor, a digital signal processor (DSP), an application-specific integrated circuit (ASIC), a field-programmable gate array (FPGA) or another programmable logic device, a discrete gate or a transistor logic device, a discrete hardware component or the like. The general-purpose processor may be a microprocessor or the processor may be any conventional processor or the like.

Optionally, in some embodiments, the capturing region may be a corresponding region obtained after the light signal is emitted upward from the ring light-emitting region and enters the non-light-emitting region after being reflected by the finger of the user.

Optionally, in some embodiments, the outer diameter of the capturing region may correspond to the inner diameter of the ring light-emitting region. For example, the outer diameter of the capturing region may be equal to the inner diameter of the ring light-emitting region.

Optionally, in some embodiments, the heart rate detection apparatus 900 may further include a lens unit configured to converge the heart rate detection light signal to the capturing region.

Optionally, in some embodiments, the sensing unit 910 may be specifically configured to periodically acquire the heart rate detection light signal.

Optionally, in some embodiments, an acquisition period of the heart rate detection light signal is 5 ms.

Optionally, in some embodiments, the processing unit 920 may be specifically configured to calculate an average value of the heart rate detection light signals acquired in each period; and determine the heart rate of the user according to the average value of the heart rate detection light signals in each period.

Optionally, in some embodiments, the processing unit 920 is further configured to filter the average value of the heart rate detection light signals, to obtain the filtered average value of the heart rate detection light signals; and determine the heart rate of the user according to the filtered average value of the heart rate detection light signals.

Optionally, in some embodiments, the processing unit 920 is specifically configured to perform sliding filtering on the average value of the heart rate detection light signals, to obtain the filtered average value of the heart rate detection light signals.

Optionally, in some embodiments, the processing unit 920 is specifically configured to perform low-pass filtering on the average value of the heart rate detection light signals with a window length being a first numerical value after an acquired period number of the heart rate detection light signal is greater than the first numerical value, to obtain a first heart rate detection light signal; perform low-pass filtering on the average value of the heart rate detection light signals with a window length being a second numerical value after an acquired period number of the heart rate detection light signal is greater than the second numerical value, to obtain a second heart rate detection light signal, where the second numerical value is greater than the first numerical value; and subtract the first heart rate detection light signal and the second heart rate detection light signal from each other, to obtain the filtered average value of the heart rate detection light signals.

Optionally, in some embodiments, the heart rate of the user satisfies an equation:

$$H = \frac{K*60000}{D*M},$$

where H is the heart rate of the user, K is a number of peaks of the average value of the heart rate detection light signals in a plurality of acquisition periods, D is a number of acquisition periods, M is the acquisition period.

Figure 10:
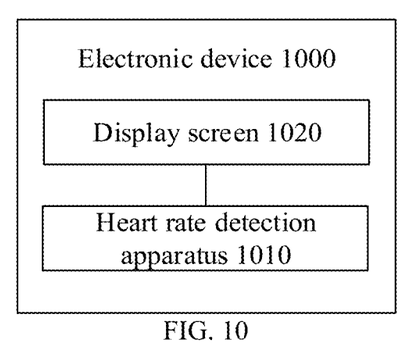
FIG. 10 is a schematic block diagram of an electronic device according to an embodiment of the present application.

The embodiment of the present application also provides an electronic portion 1000. As shown in FIG. 10, the electronic portion 1000 may include a display screen 1020 and a heart rate detection apparatus 1010, the heart rate detection apparatus 1010 may be the heart rate detection apparatus 900 in the foregoing embodiment and is disposed under the display screen 1020. As an optional embodiment, the display screen 1020 has a self-light-emitting display unit, which may be used as an excitation light source for the heart rate detection apparatus 1010 to detect the heart rate.

In addition, the heart rate detection apparatus 1010 may be used to execute the content in the method embodiment shown in FIG. 6.

It should be understood that specific examples in the embodiments of the present application are merely intended to help a person skilled in the art better understand the embodiments of the present application, but are not intended to limit the scope of the embodiments of the present application.

It should also be noted that terms used in embodiments of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

A person of ordinary skill in the art may be aware that the units in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether these functions are performed by hardware or software depends on particular applications and designed constraint conditions of the technical solutions. A person skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may be or may not be separated physically, and a component displayed as a unit may be or may not be a physical unit, namely, may be located in one place, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of software functional unit and sold or used as an independent product, the integrated unit may be stored in a computer-readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes: various media that may store program codes, such as a U-disk, a removable hard disk, a read-only memory (ROM, Read-Only Memory), a random access memory (RAM, Random Access Memory), a magnetic disk, a compact disk, and so on.

The foregoing descriptions are merely specific implementations of the present disclosure. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A heart rate detection method, applied to a terminal device including a display screen and an optical fingerprint module arranged under the display screen, the method comprising:

based on a light spot displayed on the display screen in a light-emitting period, periodically acquiring a heart rate detection light signal by the optical fingerprint module, wherein the light spot comprises a ring light-emitting region and an intermediate region surrounded by the ring light-emitting region is a non-light-emitting region, the heart rate detection light signal is a light signal that is emitted upward from the ring light-emitting region and enters a capturing region of the optical fingerprint module after being reflected by a finger of a user, the capturing region of the optical fingerprint module is arranged under the non-light-emitting region area and corresponds to part or all of the non-light-emitting region; and determining a heart rate of the user according to the heart rate detection light signal, wherein a period of acquiring the heart rate detection light signal of the optical fingerprint module is staggered with the light-emitting period of the display screen, thus avoiding interference of the display screen caused by the mutual influence of the acquisition period of the optical fingerprint module and the light-emitting period of the display screen;

wherein the determining the heart rate of the user according to the heart rate detection light signal comprises:

calculating an average value of the heart rate detection light signals in the capturing region acquired in each period; and determining the heart rate of the user according to the average value of the heart rate detection light signals in each period;

wherein the method further comprises:

performing low-pass filtering on the average value of the heart rate detection light signals with a window length being a first numerical value after a number of periods of acquiring the heart rate detection light signals is greater than the first numerical value, to obtain a first heart rate detection light signal;

performing low-pass filtering on the average value of the heart rate detection light signals with a window length being a second numerical value after a number of periods of acquiring the heart rate detection light signals is greater than the second numerical value, to obtain a second heart rate detection light signal, wherein the second numerical value is greater than the first numerical value; and subtracting the first heart rate detection light signal and the second heart rate detection light signal from each other, to obtain the filtered average value of the heart rate detection light signals.

2. The method according to claim 1, wherein the capturing region is a corresponding region obtained after the light signal is emitted upward from the ring light-emitting region and enters the non-light-emitting region after being reflected by the finger of the user.

3. The method according to claim 1, wherein an outer diameter of the capturing region corresponds to an inner diameter of the ring light-emitting region.

4. The method according to claim 3, wherein the capturing region of the optical fingerprint module is arranged only under the non-light-emitting region area and corresponds only to part or all of the non-light-emitting region.

5. The method according to claim 1, wherein the heart rate detection light signal enters the capturing region through a lens unit.

6. The method according to claim 1, wherein an acquisition period of the heart rate detection light signal is 5 ms.

7. The method according to claim 1, wherein the heart rate of the user satisfies an equation:

$$H = \frac{K*60000}{D*M},$$

wherein H is the heart rate of the user, K is a number of peaks of the average value of the heart rate detection light signals in a plurality of acquisition periods, D is a number of acquisition periods, M is the acquisition period, and the acquisition period is a period for acquiring the heart rate detection light signal.

8. A heart rate detection apparatus, applied to a terminal device including a display screen, the heart rate detection apparatus comprising:

an optical fingerprint module arranged under the display screen and configured to periodically acquire a heart rate detection light signal based on a light spot displayed on the display screen in a light-emitting period, wherein the light spot comprises a ring light-emitting region and an intermediate region surrounded by the ring light-emitting region is a non-light-emitting region, the heart rate detection light signal is a light signal that is emitted upward from the ring light-emitting region and enters a capturing region of the optical fingerprint module after being reflected by a finger of a user, the capturing region of the optical fingerprint module is arranged under the non-light-emitting region area and corresponds to part or all of the non-light-emitting region; and a processor configured to determine a heart rate of the user according to the heart rate detection light signal, wherein a period of acquiring the heart rate detection light signal of the optical fingerprint module is staggered with the light-emitting period of the display screen, thus avoiding interference of the display screen caused by the mutual influence of the acquisition period of the optical fingerprint module and the light-emitting period of the display screen;

wherein the processor is configured to:

calculate an average value of the heart rate detection light signals acquired in each period; and determine the heart rate of the user according to the average value of the heart rate detection light signals in each period;

wherein the processor is configured to:

perform low-pass filtering on the average value of the heart rate detection light signals with a window length being a first numerical value after a number of periods of acquiring the heart rate detection light signals is greater than the first numerical value, to obtain a first heart rate detection light signal;

perform low-pass filtering on the average value of the heart rate detection light signals with a window length being a second numerical value after a number of periods of acquiring the heart rate detection light signals is greater than the second numerical value, to obtain a second heart rate detection light signal, wherein the second numerical value is greater than the first numerical value; and subtract the first heart rate detection light signal and the second heart rate detection light signal from each other, to obtain the filtered average value of the heart rate detection light signals.

9. The apparatus according to claim 8, wherein the capturing region is a corresponding region obtained after the light signal is emitted upward from the ring light-emitting region and enters the non-light-emitting region after being reflected by the finger of the user.

10. The apparatus according to claim 8, wherein an outer diameter of the capturing region corresponds to an inner diameter of the ring light-emitting region.

11. The apparatus according to claim 10, wherein the capturing region of the optical fingerprint module is arranged only under the non-light-emitting region area and corresponds only to part or all of the non-light-emitting region.

12. The apparatus according to claim 8, wherein an acquisition period of the heart rate detection light signal is 5 ms.

13. The apparatus according to claim 8, wherein the heart rate of the user satisfies an equation:

$$H = \frac{K*60000}{D*M},$$

wherein H is the heart rate of the user, K is a number of peaks of the average value of the heart rate detection light signals in a plurality of acquisition periods, D is a number of acquisition periods, M is the acquisition period, and the acquisition period is a period for acquiring the heart rate detection light signal.

* * * * *